Sept. 17, 1968

J. H. GORE ETAL 3,402,104

CONTINUOUS FERMENTATION OF GLUTAMIC ACID

Filed Nov. 29, 1965

INVENTORS
JAMES H. GORE
HAROLD B. REISMAN
CHARLES H. GARDNER

United States Patent Office

3,402,104
Patented Sept. 17, 1968

3,402,104
CONTINUOUS FERMENTATION OF
GLUTAMIC ACID
James H. Gore, Riverside, and Harold B. Reisman, Danville, Pa., and Charles H. Gardner, Palos Verdes Peninsula, Calif., assignors to Merck & Co., Inc., Rahway, N.J., a corporation of New Jersey
Continuation-in-part of application Ser. No. 423,503, Jan. 5, 1965. This application Nov. 29, 1965, Ser. No. 514,758
10 Claims. (Cl. 195—47)

ABSTRACT OF THE DISCLOSURE

L-glutamic acid is produced in a continuous fermentation process with biotin-requiring microorganisms by growing the microorganisms in a nutrient growth medium under steady-state conditions in which growth culture medium is constantly transferred to another vessel which contains a growth-limiting factor (penicillin, etc.) and nutrient being added in amounts to create an equilibrium state wherein L-glutamic acid is produced in high yields at a constant rate. Overall fermentation time is reduced by using one or more additional vessels (stages). Microbial growth is developed in the first vessel, very little growth and substantial glutamic acid production occurs in the second (transition) vessel containing the inhibitor. If a third or subsequent vessels are employed glutamic acid is produced with substantially no cell multiplication.

---

Figure 1:
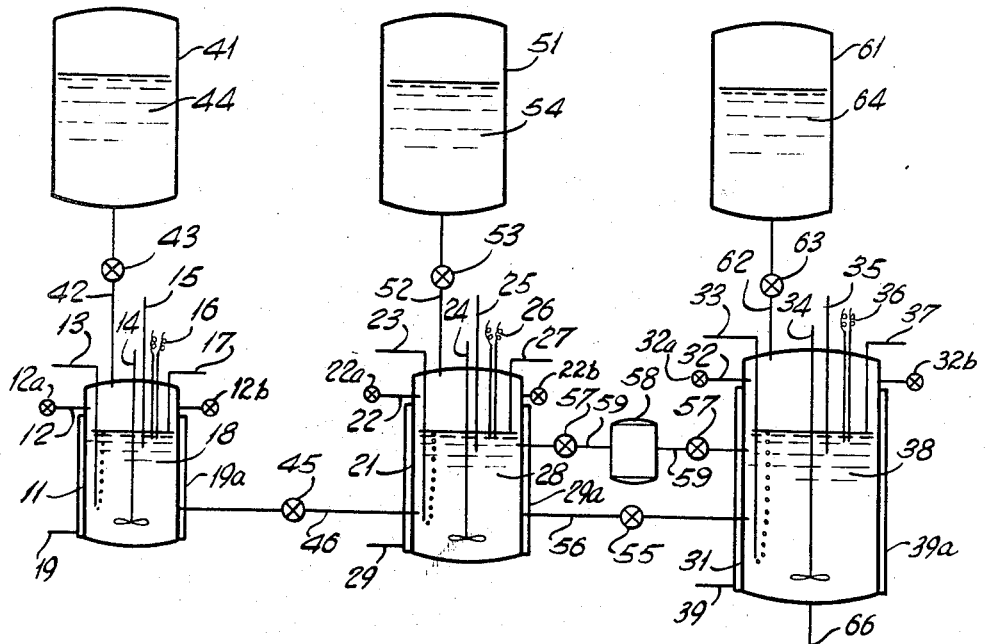

This application is a continuation-in-part of our co-pending application Ser. No. 423,503, filed Jan. 5, 1965, now abandoned.

This invention relates to a method for the production of L-glutamic acid and related salts. More particularly, it relates to an improved process of preparing glutamic acid by fermentation of a suitable nutrient medium with a biotin-requiring-L-glutamic acid producing microorganism. The biotin-requiring-L-glutamic acid producing microorganism includes precursors and analogues of biotin. Still more specifically, the present invention is concerned with a method for obtaining high yields of L-glutamic acid and related salts by continuous fermentation.

The economical production of L-glutamic acid is of considerable commercial importance since the monosodium salt thereof is highly useful as a flavor-enhancing agent in food preparation. Several methods of obtaining or producing glutamic acid have been reported in the scientific and patent literature. Many of these are chemical methods which lead to the racemic form of glutamic acid and require a resolution step to obtain the natural form, or isolation methods wherein glutamic acid is recovered from various natural sources. There have also been reports on the production of glutamic acid from α-keto glutaric acid. All of these methods leave much to be desired in that they are expensive, low yielding or dependent upon starting materials that are difficult to obtain.

L-glutamic acid may also be obtained directly from carbohydrate by batch fermentation of a nutrient medium with a suitable microorganism. Thus, Belgian Patents Nos. 554,612 and 554,619, granted Feb. 15, 1957; Japanese Patent No. 243,382, published Oct. 10, 1957; as well as Canadian Patent 562,724, issued Sept. 2, 1958; and Canadian Patent 588,846, issued Dec. 15, 1959, describe syntheses for producing glutamic acid by various microorganisms including those identified as strains of *Micrococcus glutamicus*. More recently, Chao and Foster have described glutamic acid synthesis with a bacillus identified as a *Bacillus megaterium-Bacillus cereus* intermediate type ("A Glutamic Acid Producing Bacillus," J. Bact. 77, 715, 1959). A recent U.S. patent, 3,080,297, issued Mar. 5, 1963, discloses a method of glutamic acid production by the fermentation of a nutrient media with biotin-requiring microorganisms. Microorganisms described in the literature as being of the genera Brevibacterium, *Pseudomonas aspergillus* and Arthrobacter also produce glutamic acid. The production of glutamic acid by direct batch fermentation of a nutrient medium with organisms described as strains of *Micrococcus glutamicus* is also described in U.S. Patent No. 3,003,925. This appears to be the most desirable method of direct batch fermentation and the strains of *Micrococcus glutamicus* appear to be the most efficient organisms.

Certain of the microorganisms heretofore reported as capable of producing glutamic acid have also been found to require biotin, precursors of biotin or analogues of biotin for growth. There has been further observation, however, that while biotin is necessary for growth of the organism, excessive biotin present in the fermentation media causes extremely abundant and luxuriant growth which affects adversely the production of glutamic acid. In other words, although a certain amount of biotin is essential for these biotin-requiring, glutamic acid-producing microorganisms to grow, the presence of excess biotin permits rampant growth at the expense of glutamic acid production. It is, therefore, essential in the continuous fermentation process of the present invention that the biotin level be maintained so that proper growth of the L-glutamic acid producing microorganisms is maintained and yet not allowed to exceed that level which would hinder or prevent the proper production of L-glutamic acid. It will be appreciated by those skilled in the art that this property of the biotin-requiring, glutamic acid producing microorganisms is a serious drawback to the economical production of L-glutamic acid by a continuous fermentation process since many of the commonly employed nutrient materials have a relatively high biotin content. Although the optimum concentration can be achieved without undue difficulty in a totally synthetic medium, difficulty is encountered in a naturally occurring nutrient source. This has therefore presented a serious problem since synthetic media are unusually expensive and not normally preferred in large-scale fermenation whether by batch or continuous process.

According to the present invention it has been found that a fermentation broth containing L-glutamic acid may be produced in a continuous process at a high rate and high concentration. These features are either absent from or difficult to obtain by the conventional batch processes. In addition, it has been found that by the continuous fermentation process of the present invention not only is it possible to obtain yield equivalent to the conventional batch fermentation method but in most cases the yield of L-glutamic acid is higher than that obtained with conventional batch fermentation methods.

The object of the present invention is to provide a method of preparing L-glutamic acid by continuous fermentation.

A further object of the present invention is to provide a method for producing L-glutamic acid by continuous fermentation at a high rate and in a high concentration.

A still further object of the present invention is to provide a method of producing L-glutamic acid by continuous fermentation and obtaining yields higher than those obtained with conventional batch methods.

Still another object of the present invention is to provide a continuous fermentation method for the production of L-glutamic acid which will allow substantial reduction in operating costs and equipment requirements.

Other additional objects of the present invention will become apparent to those skilled in the art by reading the specification and viewing the accompanying drawing referred to herein.

In accordance with the present invention, continuous fermentation production of L-glutamic acid can be accomplished by controlling the growth of the seed with a growth inhibitor or with the amount of carbohydrate supplied without adversely affecting the subsequent production of the L-glutamic acid.

In the main embodiment of the method of the present invention L-glutamic acid is produced continuously in a three-stage process. In a second embodiment of the present invention L-glutamic acid is produced continuously in a two-stage process. While the two-stage process is a considerable improvement over the conventional batch process with respect to cost, yield and resulting product, the three-stage process is an even greater improvement over the conventional batch process. The continuous fermentation of the present invention is carried out preferably in three stages although as pointed out above, the present invention also contemplates a two-stage process. These three stages are referred to as the growth stage, the transition stage, and the production stage. When the fermentation is carried out in the two-stage process, the transition stage and the production stage are combined to form a single stage of the process.

The microorganism is grown in a vessel and the liquor from this vessel containing the microorganism is transferred in a continuous manner to a second vessel wherein a growth inhibitor may be continuously provided and a nutrient growth medium may also be added in order to sustain the microorganism and allow for the production of L-glutamic acid. The liquor from the second vessel, the transition vessel, is continuously transferred to a third vessel, a production vessel, where further inhibitor and nutrient growth medium may be simultaneously fed for conversion to L-glutamic acid.

The continuous fermentation of the present invention is initiated by inoculating a nutrient growth medium, with a culture of the biotin-requiring-L-glutamic acid producing microorganisms that are to be used. The concentration of the carbohydrates in the nutrient growth medium that is added in the first stage is set so that the concentration of the microorganism that is attained in the first stage is from about 0.3 to about 3.0 weight percent. This carbohydrate concentration is in a range of from about 1% to about 15% by weight and preferably about 1% to about 9% by weight. The microorganism is allowed to grow under these conditions until this desired microorganism concentration is reached. A continuous flow of nutrient medium is then started to the growth fermenter vessel at a controlled rate and simultaneously the harvest of the resulting broth is recovered at a rate so as to maintain a substantially constant mass in the vessel.

It is necessary that an inhibitory environment be present in the transition stage when the cell-containing broth from the growth phase is added. This is peculiar to the continuous fermentation process of the present invention and is not done in conventional batch processes. This inhibitory environment may be accomplished by the addition of an inhibitory agent such as penicillin or by the deficiency of a required nutrient such as biotin. The addition of inhibitory agents in the production of L-glutamic acid is described in U.S. Patent 3,080,297, Mar. 5, 1963. As a result, an abrupt change in the metabolism in the microorganism occurs in the transition stage. Growth of the microorganism is arrested and L-glutamic acid is excreted into the medium. A clear line of demarcation from the transition stage to the production stage is not possible. A long residence time in the transition stage allows for accumulation of relatively high levels of L-glutamic acid and shorter residence times reduce this level. The long residence time in the transition stage allows for the production of L-glutamic acid by continuous fermentation in two stages. However, it is at this point that the three-stage process demonstrates its advantages over the process which provides for fermentation in a long residence time two-step process. The overall time for the continuous fermentation of L-glutamic acid is reduced by the utilization of the third stage, the production stage, and the resulting product which is obtained is of a higher yield and higher concentration. The concentration of microbial cells in the transition and production stages of the process of the present invention is not controlled by the ingredients that are put into the fermenter vessels as is done in other continuous fermentation processes but by the ratio of the flow from the previous vessel to the total flow of ingredients that goes into the vessel in question. In practicing the process of the present invention it is important to note that substantially all cell multiplication takes place in the first fermenter vessel with very little multiplication in the second vessel and substantially none in the third.

The broth from the transition stage is fed continuously to a third fermenter or production stage which has been previously sterilized. A continuous flow of nutrient growth medium is started simultaneously with the flow from the transition stage. In some cases it may also be necessary at the same time to start a flow of growth inhibitor to the production stage as is done in the second or transition stage. The production vessel is allowed to fill with broth from the transition vessel until the desired level is reached. Broth containing glutamic acid is then continuously harvested from the production stage so as to maintain an essentially constant mass in the vessel. The broth which is harvested in the production stage is subjected to any of various extraction procedures which are well known in the art so that L-glutamic acid is recovered.

The particular microorganism that is used in carrying out the process of the present invention is not critical. Any biotin dependent, L-glutamic acid-producing organism is suitable. These include bacteria, yeasts and fungi referred to in the literature as glumatic acid-producing strains of species named *Bacillus subtilis, Escherichia coli, Micrococcus glutamicus, Bacillus circulans, Bacillus megaterium-Bacillus cereus* intermediate types, *Brevibacterium divaricatum, Brevibacterium ammoniagenes, Arthrobacter globiforms, Bacillus megaterium, Brevibacterium roseum, Brevibacterium alanicum, Brevibacterium lactofermentum, Corynebacterium acetoacidophilum, Corynebacterium lilium, Corynebacterium callunae, Microbacterium flavum* and the like.

As growth inhibitors for the present invention, it is preferred to employ an antibiotic such as penicillin, cephalosporin C, oxamycin, novobiocin, oxytetracycline, chlortetracycline, tetracycline, streptomycin, bacitracin and the like. However, other inhibitors such as phenol, sodium propionate, resorcinol, cetyltrimethylammonium bromide and the like may be used with success if so desired.

Of the inhibitors useful in this invention, we prefer to employ an antibiotic of the group exemplified by penicillin, cephalosporin and oxamycin. Of these, penicillin is highly satisfactory. When referring to penicillin herein, the term is intended to include the various members of the penicillin group such as penicillin G, α-phenoxyethyl penicillin, phenoxymethyl penicillin, and other so-called "synthetic penicillins" which may be produced by methods known in the art.

The nutrient growth medium consists basically of carbohydrates, inorganic salts, nitrogen or a nitrogen source, and biotin which includes precursors and analogs of biotin. The carbohydrates used in the process of the present invention may be in the form of dextrose, fructose, sucrose, natural products containing these sugars such as invert, beet or blackstrap molasses. The inorganic salts should be those containing magnesium, manganese, iron, potassium, phosphates and sulfates such as magnesium sulfate, magnesium phosphate, manganese sulfate, managanese phosphate, ferrous and ferric sulfate, ferrous and ferric phosphate, potassium sulfate, and potassium phosphate. Natural or reagent grade biotin, biological precursors of biotin or analogues of biotin may be employed. The nitrogen source can be in many forms such as anhydrous ammonia, ammonia water, urea, or inorganic nitrates.

The concentration of microorganisms produced in the growth stage has an important bearing on the rate of production and yield of L-glutamic acid in the subsequent stages. The concentration of the microorganisms is controlled by the concentration of the carbohydrates, in the growth medium and within limits by controlling the retention time of the liquor in the growth stage. The supply of oxygen, pH of the fermentation broth in the growth stage, temperature, and the concentration of carbon dioxide in the exit gas also bear on the attainment of a suitable concentration of microorganisms in the growth stage. If pH is too high, cell quality is low and if pH is too low, growth of the cells is arrested. If the amount of oxygen is too low or the amount of carbon dioxide is too high, cell quality will be low. If the temperature is too high, growth of the cells will be arrested and if the temperature is too low, the growth stage will be too long. The range of ingredients and conditions which produce a suitable yield in the growth stage are shown in the following Table 1:

TABLE 1

| | |
|---|---|
| Carbohydrates _____ grams per liter__ | 10–92 |
| Nitrogen _____do____ | 0.9–10.0 |
| Inorganic salts _____do____ | 0.001–5.0 |
| Biotin _____ per liter__ | 1.4–100γ |
| Residence time _____hours__ | 1–24 |
| pH _____ | 4.5–8.5 |
| Temperature _____ °C.__ | 15–37 |

The rate at which the components of the nutrient growth medium are added to the culture broth is chosen such that the opposed effects of the addition of the nutrients, on the one hand and the effect of growth factors on the consumption of said nutrients by the microorganisms on the other hand create an equilibrium state where the rate of the multiplication of the microorganism is limited and controlled to remain constant in all parts of the growth culture broth.

In actual practice the control of the concentration of carbohydrates in the growth medium is the preferred method of controlling the concentration of the microorganism in the growth stage. Other variables in the growth stage are then fixed so that they will not hinder the desired concentration of the microorganism.

The yield of L-glutmatic acid in the transition stage, or transition/production stage when the two-stage process is utilized, is also affected by several control variables in a similar manner as those previously described for the growth stage. These are the pH of the fermentation broth in the transition stage, temperature, supply of oxygen, concentration of carbohydrates, concentration of L-glutamic acid present, residence time in the vessel, concentration of growth inhibitor, the ratio of the flow from the growth stage to the transition phase as compared to the total flow of ingredients into the transition stage, herein defined as $R_t$, and the time in transit from the growth to the transition stage. The range of ingredients and conditions which produce a suitable quality and condition for the transition stage are shown in the following Table 2:

TABLE 2

| | |
|---|---|
| Concentration of carbohydrates grams per liter__ | 0–700 |
| Concentration of nitrogen _____do____ | 0.9–8.0 |
| Concentration of inorganic salts ____do____ | 0.001–5.0 |
| Concentration of biotin _____per liter__ | 1.6–100γ |
| Concentration of glutamic acid grams per liter__ | 5–100 |
| Concentration of inhibitor _____γ/ml__ | 0–1×10⁶ |
| pH _____ | 4.5–8.5 |
| Temperature _____ °C.__ | 20–37 |
| $R_t$ (range about) _____From__ | 0.05:1–0.95:1 |
| Transit time _____ | 1 sec. to 30 min. |
| Residence time _____hours__ | 1–16 |

The rate at which growth inhibitor, growth culture broth and nutrient growth medium are added continuously to the broth the transition and production stages is chosen such that the opposed effects of the addition of growth inhibitor on the one hand and the influence of the growth factors on the consumption of components of the nutrient growth medium by the microorganisms on the other hand create an equilibrium state where the rate of multiplication of the microorganism is limited and controlled to remain constant in all parts of the transition broth.

In actual practice the residence time is used to control the concentration of the glutamic acid in the transition stage. The other variables are fixed at values that are optimum for this residence time so as to produce glutamic acid at maximum yield in the production stage.

The carbohydrate which is fed to the production stage is normally a separate stream. It may be the same carbohydrate as used in the growth and transition stage or it can differ therefrom. The nitrogen source is normally the same as that supplied in the previous stages. The residence time in the production stage is controlled so that the glutamic acid concentration increases to desired levels. The factors affecting rate and yield of glutamic acid in the production stage include residence time, pH of the fermentation broth in the production stage, temperature, oxygen supply, concentration of carbohydrates, concentration of glutamic acid from the transition stage, concentration of growth inhibitor, ratio of flow from the previous stage to the production stage as compared to the total flow of ingredients into the production stage is referred to as $R_p$ and transit time of the broth from the transition stage to the production stage. The range of ingredients and conditions which produce a suitable yield in the production stage are shown in the following Table 3:

TABLE 3

| | |
|---|---|
| Carbohydrate concentration grams per liter__ | 100–700 |
| Nitrogen concentration _____do____ | 2–20 |
| Inorganic salt concentration _____do____ | 0.001–5.0 |
| Biotin concentration _____per liter__ | 1.6–100γ |
| Glutamic acid concentration grams per liter__ | 10–100 |
| Inhibitor concentration _____γ/ml__ | 0–1×10⁶ |
| Residence time _____hours__ | 3–50 |
| Temperature _____°C__ | 20–37 |
| pH _____ | 6.0–8.5 |
| $R_p$ (range about) _____From__ | 0.05:1–0.95:1 |
| Transit time _____ | 5 sec. to 10 min. |

The rate at which growth inhibitor, transition culture broth and nutrient growth medium are added is chosen such that the opposed effects of the addition of growth inhibitors on the one hand and the influence of growth factors on the consumption of components on the nutrient growth medium by the microorganisms on the other hand create an equilibrium state where the rate of multiplication of the microorganisms is limited and controlled to remain constant in all parts of the production culture broth.

The present invention which employs either 2 or 3 fermenter vessels could be extended by placing other vessels in series. A single vessel for the growth stage could feed 2 or more transition vessels and a single transition vessel could feed 2 or more production vessels, etc.

Figure 2:
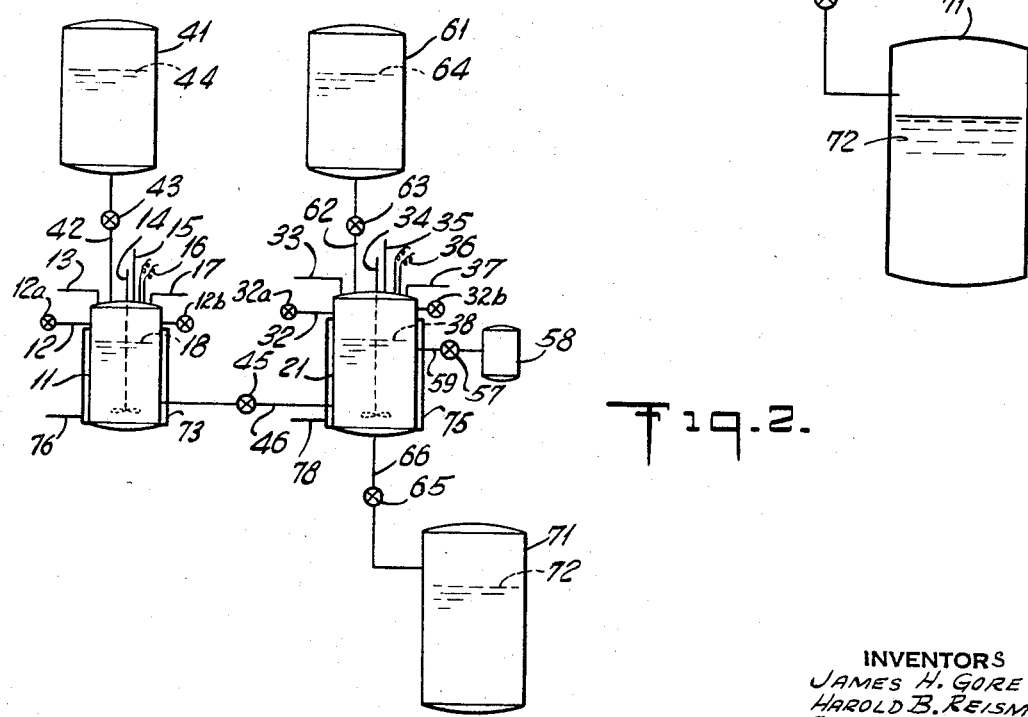

In the drawings, FIGURE 1 diagrammatically illustrates the fermenters and supply vessels for carrying out the method of the present invention in the three-stage process. FIGURE 2 diagrammatically illustrates the fermenters and supply vessels for carrying out the method of the present invention in the two-stage process.

Referring now more particularly to the drawings in detail wherein similar reference characters designate corresponding parts throughout the views, there is indicated at 11 a first fermenter designated herein as a growth fermenter in which a suitable growth medium 44 is supplied from medium vessel 41 through supply pipe 42. The supply rate of medium 44 to growth fermenter vessel 11 is controlled by valve 43. The pressure in growth fermenter vessel 11 is controlled by pressure pipe 12 and valve 12a, air supply is provided by air pipe 13, agitation of the broth 18 is provided by agitator 14, temperature is measured by thermocouple 15 and controlled by water from water line 19 to jacket 19a, the pH of broth 18 is measured by pH meter 16, foaming is controlled by pipe 17 and exhaust gas exits through exit valve 12b. The harvest of cells from fermenter vessel 11 to transition vessel 21 is accomplished through pipe 46 and controlled by valve 45. The flows from vessels 11, 21 and 31 to vessel 71 is accomplished by the pressure in the vessel. Fresh growth medium 54 is supplied from medium tank 51 through pipe 52 and controlled by valve 53. Growth inhibitor 58 is supplied to transition vessel 21 through pipe 59 and controlled by valve 57. The pressure in growth fermenter 21 is controlled by pressure pipe 22 and valve 22a, air supply is provided by air pipe 23, agitation of the broth 28 is provided by agitator 24, temperature is measured by thermocouple 25 and controlled by water from water line 29 to jacket 29a, the pH of broth 28 is measured by pH meter 26, foaming is controlled by pipe 27 and exhaust gas exits through exit valve 22b. The harvest of glutamic acid broth 28 from transition vessel 21 is accomplished through pipe 56 to production vessel 31 and controlled by valve 55. Fresh growth medium 64 is supplied from medium tank 61 through pipe 62 and controlled by valve 63. Growth inhibitor 58 is supplied to transition vessel 31 through pipe 59a and controlled by valve 57a. The pressure in growth fermenter 31 is controlled by pressure pipe 32 and valve 32a, air supply is provided by air pipe 33, agitation of the broth 38 is provided by agitator 34, temperature is measured by thermocouple 35 and controlled by water from water line 39 to jacket 39a, the pH of broth 38 is measured by pH meter 36 and foaming is controlled by pipe 37 and exhaust gas exits through exit valve 32b. The harvest of glutamic acid from fermenter vessel 31 to storage vessel 71 is accomplished through pipe 66 and controlled by valve 65. Glutamic acid broth 72 is then stored in storage vessel 71.

FIGURE 2 illustrates a second embodiment of the present invention wherein the second stage of the continuous process is eliminated and combined into the third stage; like characters from FIGURE 1 are utilized.

The following examples illustrate methods of carrying out the present invention, but it is to be understood that they are given for purposes of illustration and not of limitation:

Example 1

TWO-STAGE CONTINUOUS FERMENTATION

Seed Medium:
| | |
|---|---|
| Dextrose _____gm./l__ | 40 |
| $KH_2PO_4$ _____gm./l__ | 0.48 |
| $K_2HPO_4$ _____gm./l__ | 0.48 |
| $MgSO_4 \cdot 7H_2O$ _____gm./l__ | 0.24 |
| $FeSO_4 \cdot 7H_2O$ _____gm./l__ | 0.0096 |
| $MnSO_4 \cdot H_2O$ _____gm./l__ | 0.0096 |
| $(NH_4)_2SO_4$ _____gm./l__ | 0.48 |
| Yeast autolysate _____gm./l__ | 1.2 |
| Biotin _____γ/l__ | 8.8 |
| Polyglycol 2000' (M. glutamicus (ATCC No. 137761)) _____gm./l__ | 0.3 |

Production Medium:
| | |
|---|---|
| Dextrose _____gm./l__ | 270 |
| $(NH_4)H_2PO_4$ _____gm./l__ | 2 |
| $(NH_4)_2HPO_4$ _____gm./l__ | 2 |
| $K_2SO_4$ _____gm./l__ | 2 |
| $MgSO_4 \cdot 7H_2O$ _____gm./l__ | 0.5 |
| $MnSO_4 \cdot H_2O$ _____gm./l__ | 0.04 |
| $FeSO_4 \cdot 7H_2O$ _____gm./l__ | 0.02 |
| Biotin _____γ/l__ | 12 |
| Polyglycol 2000[1] _____gm./l__ | 0.3 |
| Penicillin _____γ/l__ | 11.1 |

[1] Polyglycol 2000 is a trademark of the Dow Chemical Company, Midland, Michigan and is a polypropylene glycol polymer anti-foam agent having an avrage molecular weight of about 2000.

OPERATING CONDITIONS AND RESULTS

| | Seed | Production |
|---|---|---|
| Residence time, hr | 11.1 | 27.8 |
| Air flow, liters per min | 6.6 | 3.96 |
| Temperature, °C | 29 | 33 |
| pH | 7.2 | 7.6 |
| Operating volume, liters | 10 | 10 |
| Cell volume, (M. glutamicus) (ATCC No. 13761) percent | 9 | 4.5 |
| $O_2$ used, milligram moles per liter per hr | 81.4 | 31.8 |
| $R_p$ Factor | | 0.5:1 |
| Glutamic acid, gm./liter | | 51 |
| Overall Efficiency, mole percent | | 43.8 |

Example 2

TWO-STAGE CONTINUOUS FERMENTATION

Seed Medium:
| | |
|---|---|
| Invert Molasses _____gm./l__ | 54 |
| $(NH_4)H_2PO_4$ _____gm./l__ | 0.3 |
| $(NH_4)_2HPO_4$ _____gm./l__ | 0.3 |
| $MgSO_4 \cdot 7H_2O$ _____gm./l__ | 0.2 |
| $MnSO_4 \cdot H_2O$ _____gm./l__ | 0.01 |
| $K_2SO_4$ _____gm./l__ | 4 |
| Biotin _____γ/l__ | 5 |
| Polyglycol 2000[1] (M. glutamicus (ATCC No. 13761)) _____gm./l__ | 0.3 |

Production Medium:
| | |
|---|---|
| Invert Molasses _____gm./l__ | 360 |
| $(NH_4)H_2PO_4$ _____gm./l__ | 2 |
| $(NH_4)_2HPO_4$ _____gm./l__ | 2 |
| $K_2SO_4$ _____gm./l__ | 2 |
| $MgSO_4 \cdot 7H_2O$ _____gm./l__ | 0.5 |
| $MnSO_4 \cdot H_2O$ _____gm./l__ | 0.04 |
| Polyglycol 2000[1] _____gm./l__ | 0.3 |
| Penicillin _____γ/l__ | 11.1 |

[1] Same as in Example 1.

OPERATING CONDITIONS AND RESULTS

|  | Seed | Production |
|---|---|---|
| Residence time, hr | 11.1 | 27.8 |
| Air flow, liters or min | 6.6 | 3.96 |
| Temperature, °C | 29 | 33 |
| pH | 7.2 | 7.6 |
| Operating volume, liters | 10 | 10 |
| Cell volume, (M. glutamicus) (ATCC No. 13761) percent | 29 | 6 |
| $O_2$ used, milligram moles per liter per hr | 53 | 35 |
| $R_p$ Factor |  | 0.5:1 |
| Glutamic acid, gm./liter |  | 52 |
| Overall Efficiency, mole percent |  | 43.4 |

EXAMPLE 3

THREE-STAGE CONTINUOUS FERMENTATION

Seed Medium:
- Dextrose _____ gm./l__ 40
- $KH_2PO_4$ _____ gm./l__ 0.48
- $K_2HPO_4$ _____ gm./l__ 0.48
- $MgSO_4 \cdot 2H_2O$ _____ gm./l__ 0.24
- $FeSO_4 \cdot 7H_2O$ _____ gm./l__ 0.0096
- $MnSO_4 \cdot H_2O$ _____ gm./l__ 0.0096
- $(NH_4)_2SO_4$ _____ gm./l__ 0.48
- Yeast Autolysate _____ gm./l__ 1.2
- Biotin _____ γ/l__ 8.8
- Polyglycol 2000 [1] (M. glutamicus (ATCC No. 13761)) _____ gm./l__ 0.4

Transition medium:
- Invert molasses _____ gm./l__ 340
- Polyglycol 2000 [1] _____ gm./l__ 0.3
- Penicillin _____ γ/l__ 7.4

Production medium, none.

[1] Same as in Example 1.

OPERATING CONDITIONS AND RESULTS

|  | Seed | Transition | Production |
|---|---|---|---|
| Residence time, hr | 8.3 | 18.5 | 19.6 |
| Air flow, liters per min | 6.6 | 6.6 | 5.28 |
| Temperature, °C | 29 | 33 | 33 |
| pH | 7.2 | 7.6 | 7.6 |
| Operating volume, liters | 10 | 10 | 10 |
| Cell volume (M. glutamicus) (ATCC No. 13761) percent | 13 | 4 | 4 |
| $O_2$ used, milligram moles per liter per hr | 82.5 | 40.7 | 25.6 |
| $R_t$ and $R_p$ Factors |  | 0.3:1 | 0.3:1 |
| Glutamic acid, gm./liter |  | 23 | 48 |
| Overall Efficiency, mole percent |  |  | 39.6 |

EXAMPLE 4

THREE-STAGE CONTINUOUS FERMENTATION

Seed Medium:
- Corn steep liquor _____ gm./l__ .75
- Blackstrap molasses _____ gm./l__ 60.0
- $H_3PO_4$ (75%) _____ gm./l__ 1.7
- $MnSO_4 \cdot H_2O$ _____ gm./l__ .01
- $(NH_4)_2SO_4$ (M. glutamicus (ATCC No. 13761)) _____ gm./l__ .3

Transition Medium:
- Blackstrap molasses _____ gm./l__ 427
- Penicillin _____ γ/l__ 91

Production Medium, none.

Neutralize with KOH to pH 7.0 prior to sterilization.

OPERATING CONDITIONS AND RESULTS

|  | Seed | Transition | Production |
|---|---|---|---|
| Residence time, hr | 5.5 | 4.2 | 8.0 |
| Air flow, liter per minute | 2.0 | 2.0 | 5.0 |
| Temperature, °C | 29 | 33 | 33 |
| pH | 7.0 | 7.6 | 7.6 |
| Operating volume, liters | 3 | 3 | 10.1 |
| Cell volume (M. glutamicus) (ATCC No. 13761) percent | 34 | 17 | 10 |
| $O_2$ used, milligram moles per liter per hr | 61 | 105 | 47 |
| $R_t$ and $R_p$ Factors |  | 0.75:1 | 0.43:1 |
| Glutamic acid, gm./l |  | 21.2 | 34.7 |
| Overall Efficiency, mole percent |  |  | 42.2 |

EXAMPLE 5

TWO-STAGE CONTINUOUS FERMENTATION

Seed Medium:
- Invert molasses _____ gm./l__ 40
- Corn steep liquor _____ gm./l__ 12
- $(NH_4)H_2PO_4$ _____ gm./l__ 1
- $(NH_4)_2HPO_4$ _____ gm./l__ 1
- $MnSO_4 \cdot H_2O$ _____ gm./l__ 0.01
- Polyglycol 2000 [1] (M. glutamicus (ATCC No. 13761)) _____ gm./l__ 0.3

Production Medium:
- Invert molasses _____ gm./l__ 360
- Polyglycol 2000 [1] _____ gm./l__ 0.4
- Penicillin _____ γ/l__ 7.7

[1] Same as in Example 1.

OPERATING CONDITIONS AND RESULTS

|  | Seed | Production |
|---|---|---|
| Residence time, hr | 4.5 | 25.6 |
| Air flow, s.c.f.m.[1] | 7 | 30 |
| Temperature, °C | 33 | 35 |
| pH | 7.2 | 7.6 |
| Operating volume, liters | 270 | 2,560 |
| Cell volume (M. glutamicus) (ATCC No. 13761) | 40 | 5 |
| $O_2$ used, milligram moles per liter per hr | 85 | 35 |
| $R_t$ Factor |  | 0.60:1 |
| Glutamic acid, gm./liter |  | 42 |
| Overall Efficiency, mole percent |  | 42.2 |

[1] Cubic feet per minute at standard conditions of 20° C. and 760 millimeter pressure.

EXAMPLE 6

TWO-STAGE CONTINUOUS FERMENTATION

Seed Medium:
- Blackstrap molasses _____ gm./l__ 51
- Corn steep liquor _____ gm./l__ 5.1
- Phosphoric acid (75%) _____ gm./l__ 1.26
- $MnSO_4 \cdot H_2O$ _____ gm./l__ 0.01
- $MgSO_4 \cdot 7H_2O$ _____ gm./l__ 0.111
- $(NH_4)_2SO_4$ _____ gm./l__ 0.222
- Polyglycol 2000 [1] (M. glutamicus (ATCC No. 13761)) _____ gm./l__ 0.139

Production Medium:
- Blackstrap molasses _____ gm./l__ 660
- Polyglycol 2000 [1] _____ gm./l__ 0.139
- Penicillin _____ γ/l__ 17.7

Neutralize with KOH to pH 7.0 prior to sterilization.

[1] Same as in Example 1.

OPERATING CONDITIONS AND RESULTS

|  | Seed | Production |
|---|---|---|
| Residence time, hr | 3.94 | 27.6 |
| Air flow, s.c.f.m.[1] | 6 | 20 |
| Temperature, °C | 33 | 35 |
| pH | 7.2 | 7.6 |
| Operating volume, liters | 270 | 2,850 |
| Cell volume (M. glutamicus) (ATCC No. 13761) percent | 50 | 5 |
| $O_2$ used, milligram moles per liter per hr | 96 | 73 |
| $R_t$ Factor |  | 0.666:1 |
| Glutamic acid, gm./liter |  | 55 |
| Overall Efficiency, mole percent |  | 49.5 |

[1] Cubic feet per minute at standard conditions of 20° C. and 760 millimeter pressure.

EXAMPLE 7

THREE-STAGE CONTINUOUS FERMENTATION

Seed Medium:
- Blackstrap molasses _____ gm./l__ 66
- Corn steep liquor _____ gm./l__ 6.7
- Phosphoric acid _____ gm./l__ 1.68
- $MnSO_4 \cdot H_2O$ _____ gm./l__ 0.0133
- $(NH_4)_2SO_4$ _____ gm./l__ 0.296
- Polyglycol 2000 [1] (M. glutamicus (ATCC No. 13761)) _____ gm./l__ 0.139

EXAMPLE 7

Transition Medium:

| | | |
|---|---|---|
| Blackstrap molasses | gm./l | 540 |
| Polyglycol 2000 [1] | gm./l | 0.139 |
| Penicillin | γ/l | 28.8 |

Production Medium, same as transition medium except Penicillin 24.3 γ/l.

Neutralize with KOH to pH 7.2 prior to sterilization.

[1] Same as in Example 1.

OPERATING CONDITIONS AND RESULTS

| | Seed | Transition | Production |
|---|---|---|---|
| Residence time, hr | 5.2 | 6.3 | 37.3 |
| Air Flow, s.c.f.m.[1] | 4 | 7 | 20 |
| Temperature, °C | 33 | 35 | 35 |
| pH | 7.2 | 7.6 | 7.6 |
| Operating volume, liters | 250 | 400 | 2,800 |
| Cell volume, (*M. glutamicus*) (ATCC No. 13761) percent | 50 | 30 | 7 |
| $O_2$ used, milligram moles per liter per hr | ([2]) | ([2]) | ([2]) |
| $R_t$ and $R_p$ Factors | | 0.763:1 | 0.640:1 |
| Glutmaic acid, gm./liter | | 20 | 58 |
| Overall Efficiency, mole percent | | | 48.7 |

[1] Cubic feet per minute at standard conditions of 20° C. and 760 milli meter pressure.
[2] Not available.

EXAMPLE 8

TWO-STAGE CONTINUOUS FERMENTATION

Seed Medium:

| | | |
|---|---|---|
| Dextrose | gm./l | 88 |
| $NH_4H_2PO_4$ | gm./l | 0.48 |
| $(NH_4)_2HPO_4$ | gm./l | 0.48 |
| $MgSO_4 \cdot 7H_2O$ | gm./l | 0.24 |
| $MnSO_4 \cdot H_2O$ | gm./l | 0.0096 |
| $FeSO_4 \cdot 7H_2O$ | gm./l | 0.0096 |
| $K_2SO_4$ | gm./l | 0.24 |
| Polyglycol 2000 [1] (*M. glutamicus* (ATCC No. 13761)) | gm./l | 0.30 |
| Yeast Autolysate | gm./l | 0.24 |
| Biotin | γ/l | 2.5 |

Production Medium, None [2].

[1] Same is in Example 1.
[2] In this stage, no additional neutrient growth medium or inhibitor is added. Only the culture broth from the growth stage is transferred to the production stage.

OPERATING CONDITIONS AND RESULTS

| | Seed | Production |
|---|---|---|
| Residence time, hr | 5.5 | 33.3 |
| Air Flow, s.c.f.m.[1] | 0.14 | 0.14 |
| Temperature, °C | 33 | 33 |
| pH | 7.2 | 7.2 |
| Operating volume, liters | 2 | 10 |
| Cell volume (*M. glutamicus*) (ATCC No. 13761) percent | 8 | 8 |
| Glutamic acid, gm./liter | 2.4 | 23.7 |
| Overall Efficiency, percent | | 35.6 |
| $R_p$ Factor | | 1.1 |

[1] Flow in standard cubic feet per minute.

Example 8 above illustrates a method of the present invention in which the inhibitory environment does not include a specific inhibitor but the inhibitor environment is created by a deficiency in the amount of biotin present.

From the foregoing it will be seen that there is herein provided an improved method for the production of glutamic acid by continuous fermentation which accomplishes all of the objects of the present invention and others including many advantages of great practical utility and commercial importance and acceptance.

While specific embodiments of the present invention have been named and described, it will be apparent to those skilled in the art that changes may be made in the detail shown without departing from the spirit of the present invention or the scope intended. Any departure from the above description which conforms to the present invention is intended to be included within the scope of the claims.

We claim:

1. A method for the continuous production of L-glutamic acid or a salt thereof by fermentation of a nutrient medium with biotin-requiring L-glutamic acid-producing microorganism that comprises:

(i) inoculating a nutrient growth medium with a biotin-requiring glutamic acid-producing microorganism in an agitated aerated growth-stage vessel, continuously adding nutrient growth medium to said vessel and continuously removing culture broth from said vessel, the rates of said addition and removal being essentially the same, and the rate of addition of nutrient growth medium being such that the concentration of nutrients on the one hand and concentration of growth factors on the other hand create an equilibrium state wherein the rate of propagation of the microorganism remains constant;

(ii) continuously transferring the growth culture broth removed from said growth-stage vessel at a constant volumetric rate to a production-stage vessel wherein a growth inhibitory environment exists, concurrently and continuously adding, as necessary, at a constant volumetric rate, a growth-limiting factor and nutrient growth medium to said production-stage vessel, agitating and aerating said growth culture broth in said production-stage vessel, and removing L-glutamic acid-containing culture broth from said production-stage vessel, the rate of addition of growth culture broth and growth-limiting factor being such that concentration of growth limiting factors on the one hand and concentration of growth nutrients on the other hand create an equilibrium state wherein the production of L-glutamic acid by the microorganism remains essentially constant;

(iii) and recovering L-glutamic acid or a salt thereof from the culture broth removed from said production stage vessel.

2. A method for the continuous production of L-glutamic acid or a salt thereof by fermentation of a nutrient medium with biotin-requiring L-gluatmic acid-producing microorganisms that comprises:

(i) inoculating a nutrient growth medium with a biotin-requiring glutamic acid-producing microorganism in an agitated aerated growth-stage vessel, continuously adding nutrient growth medium to said vessel and continuously removing culture broth from said vessel, the rates of said addition and removal being essentially the same, the rate of addition of nutrient growth medium being such that the concentration of nutrients on the one hand and concentration of growth factors on the other hand create an equilibrium state wherein the rate of propagation of the microorganism remain constant;

(ii) continuously transferring the growth culture broth removed from said growth-stage vessel at a constant volumetric rate to a transition-stage vessel wherein a growth inhibitory environment exists, concurrently and continuously adding, as necessary, at a constant volumetric rate, a growth inhibiting factor and nutrient growth medium to said transition-stage vessel, agitating and aerating said growth culture broth in said transition-stage vessel, and removing transition culture broth from said transition-stage vessel, the rate of addition of growth-limiting factor on the one hand and the concentration of growth nutrients on the other hand create an equilibrium state wherein the rate of propagation of the microorganism remains constant;

(iii) continuously transferring the transition culture broth removed from said transition-stage vessel at a constant volumetric rate to a production-stage vessel wherein a growth inhibitory environment exists, concurrently and continuously adding, as necessary, at a constant volumetric rate, a growth-limiting factor and nutrient growth medium to said production-stage vessel, agitating and aerating said growth culture broth in said production-stage vessel, and removing L-glutamic acid-containing culture broth from said production-stage vessel, the rate of addition of transition culture broth and growth-limiting factor being such that concentration of growth limiting factors on the one hand and concentration of growth nutrients on the other hand create an equilibrium state wherein the production of L-glutamic acid by the microorganism remains essentially constant;

(iv) and recovering L-glutamic acid or a salt thereof from the culture broth removed from said production-stage vessel.

3. The method of claim 2 wherein (a) the residence time in the growth-stage vessel is from about 1 to about 25 hours, in the transition-stage vessel the residence time is from about 2 to about 16 hours and in the production-stage vessel the residence time is from about 3 to about 50 hours; (b) the pH range in the growth-stage vessel is from about 4.5 to about 8.5, in the transition-stage vessel the pH range is from about 4.5 to about 8.5 and in the production-stage vessel the pH range is from about 6.0 to about 8.5; (c) the temperature range in the growth-stage vessel is from about 15° C. to about 37° C., in the transition-stage vessel the temperature range is from about 20° C. to about 37° C. and in the production-stage vessel the temperature range is from about 25° C. to about 42° C.

4. The method of claim 2 wherein the ratio of the flow of the growth-stage vessel broth into the transition-stage vessel as compared to the total flow of ingredients going into the transition-stage vessel is from about 0.05:1 to about 0.95:1 and the ratio of the flow of the transition-stage vessel broth into the production-stage vessel as compared to the total flow of ingredients going into the production-stage vessel is from about 0.05:1 to about 0.95:1.

5. The method of claim 2 wherein the concentration of the microorganism in the first stage is in the range of between 1 and about 15 weight percent of the inoculating culture and preferably between 1 and about 9 weight percent.

6. The method of claim 2 wherein the concentration of carbohydrate in the nutrient growth medium supplied to the growth-stage vessel is about 10 to about 100 grams per liter, the concentration of carbohydrate in the nutrient growth medium supplied to the transition-stage vessel is about 1 to about 700 grams per liter, and the concentration of carbohydrate in the nutrient growth medium supplied to the production-stage vessel is about 100 to about 700 grams per liter.

7. The method of claim 2 wherein the nutrient growth medium comprises:

(a) carbohydrates (grams per liter, about) -- 10–100
(b) inorganic salts (grams per liter, about) -- 0.001–5.0
(c) biotin ($\gamma$ per liter, about) -- 1.6–100
(d) nitrogen (grams per liter, about) -- 0.9–8.0

8. The method of claim 2 wherein the transit time from the growth-stage vessel to the transition-stage vessel is from about 1 second to about 30 minutes and the transit time from the transition-stage vessel to the production-stage vessel is from about 5 seconds to about 10 minutes.

9. The method of claim 1 wherein said biotin-requiring L-glutamic acid-producing organism is *Micrococcus glutamicus*; said nutrient growth medium comprises from about 10 to about 100 grams per liter of a carbohydrate, about 0.9 to about 8.0 grams per liter of nitrogen, 0.001 to 5.0 grams per liter of inorganic salts, and 1.6 to 100$\gamma$ per liter of biotin; said agitation and aeration in said growth-stage vessel being done at pH between about 4.5 to about 8.5 at a temperature of between about 15° C. to about 37° C. and for a time of from about 1 hour to about 24 hours; the transit time from said growth-stage vessel to said production-stage vessel being from about 1 second to about 30 minutes; said agitation and aeration in said production-stage vessel being done at pH between about 6.0 to about 8.5 at a temperature of between about 20° C. to about 37° C. and for a time of from about 3 hours to about 50 hours; the ratio of flow of growth culture broth from the growth-stage vessel into the production-stage vessel as compared to the total flow of growth culture broth, nutrient growth medium and growth inhibitor into the production-stage vessel is from about 0.05:1 to about 0.95:1.

10. The method according to claim 2 wherein said biotin-requiring L-glutamic acid-producing organism is *Micrococcus glutamicus*; said nutrient growth medium comprises from about 10 to 700 grams per liter of a carbohydrate, 9.0 to 10 grams per liter of nitrogen, 0.001 to 5.0 grams per liter of inorganic salts, and 1.6 to 100$\gamma$ per liter of biotin; said agitation and aeration in said growth-stage vessel being done at pH of between about 4.5 and about 8.5 at a temperature of between about 15° C. and about 37° C. for a period of time from about 1 hour to about 24 hours; the transit time from said growth-stage vessel to said transition stage vessel being from about 1 second to about 30 minutes; said agitation and aeration in said transition-stage vessel being done at pH of between about 4.5 and about 8.5 at a temperature of between about 20° C. and 37° C. and for a time of from about 1 hour to about 16 hours; the ratio of flow of growth culture broth from the growth-stage vessel into the production-stage vessel as compared to the total flow of growth culture broth, nutrient growth medium and growth inhibitor into the transition-stage vessel is from about 0.05:1 to about 0.95:1; the transit time from said transition-stage vessel to said production-stage vessel being from about 1 second to about 30 minutes; said agitation and aeration in said production-stage vessel being done at pH of between about 6.0 and about 8.5 at a temperature of between about 20° C. and about 37° C. for a time from about 30 hours to about 50 hours; the ratio of flow of transition culture broth from the transition-stage vessel into the production-stage vessel as compared to the total flow of transition culture broth, nutrient growth medium and growth inhibitor into the production-stage vessel is from about 0.05:1 to about 0.95:1.

References Cited

UNITED STATES PATENTS

| | | | |
|---|---|---|---|
| 3,015,612 | 1/1962 | Pirt et al. | 195—141 |
| 3,080,297 | 3/1963 | Phillips et al. | 195—47 |
| 3,254,002 | 5/1966 | Megna et al. | 195—47 |

FOREIGN PATENTS

| | | |
|---|---|---|
| 658,581 | 2/1963 | Canada. |

LIONEL M. SHAPIRO, *Primary Examiner.*